United States Patent
Kim et al.

(10) Patent No.: US 9,325,795 B2
(45) Date of Patent: Apr. 26, 2016

(54) METHOD OF AND SYSTEM FOR PROVIDING APPLICATION STORE SERVICE

(75) Inventors: Ju Hun Kim, Suwon-si (KR); Hae Don Chon, Yongin-si (KR); Jeong Hoe Ku, Yongin-si (KR); Du Il Kim, Suwon-si (KR); Sang Seok Lim, Yongin-si (KR); Jin Hee Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 13/083,911

(22) Filed: Apr. 11, 2011

(65) Prior Publication Data

US 2011/0250872 A1    Oct. 13, 2011

(30) Foreign Application Priority Data

Apr. 9, 2010  (KR) .................. 10-2010-0032493

(51) Int. Cl.
| | |
|---|---|
| *H04L 29/08* | (2006.01) |
| *G06F 17/30* | (2006.01) |
| *H04L 29/12* | (2006.01) |
| *H04W 4/00* | (2009.01) |

(52) U.S. Cl.
CPC .......... *H04L 67/16* (2013.01); *G06F 17/30861* (2013.01); *H04L 29/12113* (2013.01); *H04L 61/1541* (2013.01); *H04L 67/34* (2013.01); *H04W 4/003* (2013.01)

(58) Field of Classification Search
CPC ... G06F 17/30861; H04L 67/16; H04W 4/003
See application file for complete search history.

(56) References Cited

U.S. PATENT DOCUMENTS

| | | | |
|---|---|---|---|
| 2005/0198292 A1* | 9/2005 | Duursma et al. .............. | 709/225 |
| 2007/0252678 A1* | 11/2007 | Garcia Alonso et al. .. | 340/10.31 |
| 2009/0037287 A1* | 2/2009 | Baitalmal et al. ............... | 705/26 |
| 2009/0245184 A1* | 10/2009 | Torres et al. .................. | 370/329 |
| 2010/0248699 A1* | 9/2010 | Dumais ....................... | 455/414.1 |
| 2011/0010759 A1* | 1/2011 | Adler ................................ | 726/4 |
| 2011/0154187 A1* | 6/2011 | Sadowski et al. ............. | 715/235 |
| 2011/0185354 A1* | 7/2011 | Tanner et al. .................. | 717/178 |
| 2012/0023088 A1* | 1/2012 | Cheng et al. .................. | 707/707 |
| 2012/0124028 A1* | 5/2012 | Tullis ........................ | G06F 8/60 707/711 |
| 2012/0191694 A1* | 7/2012 | Gardiol et al. ................ | 707/709 |

* cited by examiner

*Primary Examiner* — Joe Chacko
(74) *Attorney, Agent, or Firm* — Jefferson IP Law, LLP (57) ABSTRACT

A method of providing an Application Store (AppStore) service is provided. The method includes executing searching application, transmitting first request message to a directory service server, the first request message including a request for an AppStore list, receiving a first response message including the AppStore list from the directory service server, transmitting a second request message to at least one AppStore server that is selected from the AppStore list, the second request message including a request for a browser application, receiving a second response message including the browser application from at least one AppStore server, and creating items corresponding to the browser application and displaying the items as a list.

14 Claims, 5 Drawing Sheets

METHOD OF AND SYSTEM FOR PROVIDING APPLICATION STORE SERVICE

PRIORITY

This application claims the benefit under 35 U.S.C. § 119(a) of a Korean patent application filed on Apr. 9, 2010 in the Korean Intellectual Property Office and assigned Ser. No. 10-2010-0032493, the entire disclosure of which is hereby incorporated by reference.

BACKGROUND OF THE INVENTION

1. Field of the Invention

The present invention relates to a method of and a system for providing an 'app store' (application store) service in a mobile terminal. More particularly, the present invention relates to an establishment of an environment in which information about app stores is acquired and an app store service by the app stores is supported and a method of controlling the same.

2. Description of the Related Art

With the development of information and communication technologies and semiconductor technologies, mobile terminals are rapidly and widely used. Recently, the latest mobile terminal includes technologies that converge the functions of a plurality of types of mobile terminals. Typically, mobile communication terminals, in addition to standard communication functions such as voice call and message transmission, have various additional functions, such as a TV viewing function, for example mobile broadcasting such as Digital Multimedia Broadcasting (DMB) and Digital Video Broadcasting (DVB), music reproducing function such as Motion Picture Experts Group (MPEG-1) or MPEG-2 audio Layer-3 (MP3), photographing function, internet function, etc.

Recently, a 'online mobile content (software) market,' where mobile applications such as schedulers, address books, alarms, calculators, games, motion pictures, internet access, music reproduction, navigators, word processors, and spreadsheets are traded freely, are becoming available. The mobile content market is called an Application Store, or AppStore.

The AppStore is not a closed market where large enterprises develop applications and mobile communication enterprises sell the developed application, but an open market where any individual may develop and sell applications. Anybody may develop and sell an application to global users using a Software Development Kit (SDK) published by a management enterprise.

When the application developed by an independent individual is registered to the AppStore, consumers access the AppStore through his/her wireless communication network to download the selected application to his/her mobile terminal or to download the same to a personal computer and to transfer the downloaded application to his/her mobile terminal.

However, the AppStore is implemented in the form in which a subject managing the AppStore becomes one of the providers. Every developer accesses one AppStore to register applications. Users of the AppStore select only one AppStore due to a preset AppStore access function of a mobile terminal, but neither select nor use multiple AppStores.

Therefore, since every developer accesses one AppStore, it is difficult to deal with various AppStores. Since the present AppStore does not accept several AppStores, a monopoly on the AppStore service may arise. Users of the AppStore cannot use a price comparison service for desired applications.

SUMMARY OF THE INVENTION

An aspect of the present invention is to address at least the above-mentioned problems and/or disadvantages and to provide at least the advantages described below. Accordingly, an aspect of the present invention is to provide a method of providing an Application Store (AppStore) service to allow users to use various AppStores and a system for performing the same.

Another aspect of the present invention also is to provide a method of invigorate AppStore by allowing several AppStores and of allowing an independent user to select at least one desired AppStore from several AppStores and a system for implement the same.

Another aspect of the present invention also is to construct an environment where at least one desired AppStore is selected from several AppStores in a mobile terminal.

In accordance with an aspect of the present invention, a method of providing an AppStore service in a mobile terminal is provided. The method includes executing a searching application, transmitting a first request message to a directory service server, the first request message including a request for an AppStore list, receiving a first response message including an AppStore list from the directory service server, transmitting a second request message to at least one AppStore server that is selected from the AppStore list, the second request message including a request for a browser application, receiving a second response message including a browser application from the at least one AppStore server, and creating items corresponding to the browser application and displaying the items in the form of a list.

In accordance with an aspect of the present invention, a method of providing an AppStore service is provided. The method includes request, by a mobile terminal, an AppStore list from a directory service server, transmitting, by the directory server, an AppStore list in response to the request from the mobile terminal, requesting, by the mobile terminal, a browser application from at least one AppStore server selected from the AppStore list, transmitting, by the at least one AppStore server, a browser application in response to the request from the mobile terminal, and creating, by the mobile terminal, when at least one browser application is received, an item corresponding to the corresponding browser application by the mobile terminal.

In accordance with an aspect of the present invention, an AppStore service providing system is provided. The system includes at least one AppStore server for providing an application corresponding to an AppStore service, a directory service server for communicating with the at least one AppStore server and for managing AppStore server information provided from the at least one AppStore server as an AppStore list, and a mobile terminal for acquiring the AppStore from the directory service server, for acquiring a browser application from at least one AppStore server selected from the AppStore list, for creating an item corresponding to the acquired browser application, and for processing access to a corresponding AppStore server based on the item.

In accordance with an aspect of the present invention, a method of providing an AppStore to a user is provided. The method includes requesting, by a mobile terminal, a list of a plurality of AppStores available to the mobile terminal, receiving the list from a directory service server to which the request was addressed, requesting an application from at least one of the plurality of AppStores included in the list, receiving the application in response to the request, and creating, in the mobile terminal, an item corresponding to the application.

According to the method of and the system for providing AppStore service of the present invention, a system for supporting distributed AppStore services by searching an AppStore directory and a method of controlling the same is provided. The system and the method may provide a structure to allow multiple AppStores and an environment in which a user may optionally select a desired AppStore. As a result, high quality service by competition between service providers and various services may be provided as compared to the existing single AppStore service. Moreover, according to aspects of the present invention, since applications may be acquired not from a fixed AppStore but from an AppStore selected from plural AppStores by a user, price competitiveness and frequency of use of the AppStore may be increased.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method of and a system for providing an AppStore, that is, a mobile content (software) market. Typically, when a developer registers an application in an AppStore, consumers may access the AppStore via a network and may download selected applications to their mobile terminals. However, only one fixed AppStore is used for each environment in which AppStores are provided. Thus, according to an exemplary embodiment of the present invention, an expanded AppStore service, in which a user may select an application from at least one AppStore selected from among a plurality of AppStores, is provided.

A mobile terminal according to an exemplary embodiment of the present invention and a method of controlling the mobile terminal will be described with reference to FIGS. 1 to 5. However, the mobile terminal according to exemplary embodiments of the present invention and the method of controlling the same are neither limited nor restricted to the following description, but may be applied to various cases based on the following exemplary embodiments of the present invention.

Figure 1:
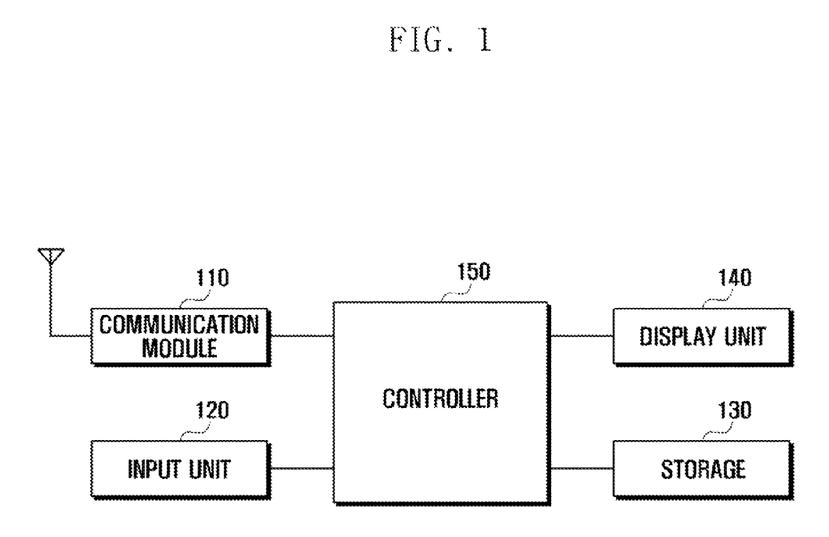
FIG. 1 is a block diagram schematically illustrating a configuration of a mobile terminal according to an exemplary embodiment of the present invention.

FIG. 1 is a block diagram schematically illustrating a configuration of a mobile terminal according to an exemplary embodiment of the present invention.

Referring to FIG. 1, a mobile terminal includes a communication module 110, an input unit 120, a storage 130, a display unit 140, and a controller 150. While not shown, the mobile terminal may also include addition units. For example, the mobile terminal may further include an audio unit having a microphone and a speaker, a digital broadcasting module performing reception and reproduction of digital broadcasting, for example, mobile broadcasting such as Digital Multimedia Broadcasting (DMB) and Digital Video Broadcasting (DVB), a camera module, and a Bluetooth module performing Bluetooth communication. As these components are not required, and their construction would be apparent to those skilled in the art, their description will be omitted.

The communication module 110 may be one of a Radio Frequency (RF) communication module performing a communication function such as a voice call and a message transmission and an internet communication module performing internet communication function, supported by a mobile terminal. The communication module 110 may include at least one of the RF communication module and the internet communication module. The communication module 110 receives data transmitted from the outside, for example, a directory server, an AppStore server, etc. and delivers the same to the controller 150. The data may include an AppStore list, an AppStore browser application, etc.

The input unit 120 detects user's manipulation and generates an input signal corresponding to the user's manipulation to transmit the generated input signal to the controller 150. The input unit 120 may include several buttons. The input unit 120 may include at least one button to generate an input signal for connection to the outside such as a directory server, an AppStore server, etc.

The storage 130 stores various programs and data executed and processed in the mobile terminal and may include at least one volatile memory and non-volatile memory. For example, the storage 130 may store an operating system of a mobile terminal, programs and data related to operation and control of the communication module 110, and programs and data related to operation and control of the AppStore service, spontaneously or permanently. The storage 130 may store an AppStore list received from a Directory Service Server (DSS), an AppStore browser application received from the AppStore server, and items such as an icon, text, etc., generated based on the received AppStore browser application, when an AppStore service is provided. The AppStore list stored in the storage 130 may be updated into an AppStore list received from the DDS according to the execution of a search application.

The AppStore list indicates a list representing information on at least one AppStore server supporting the AppStore service. The AppStore browser application indicates an application having a function of directly accessing an AppStore server corresponding to the AppStore browser application itself. In this disclosure, the AppStore list and the AppStore browser application are classified for the convenience of description.

The display unit 140 provides execution screens of applications supported by the mobile terminal, such as a messaging function, an electronic mail function, an internet function, a web-browsing function, a multimedia function, a searching function, a communication function, an electronic book reading function (e-book function), a motion picture function, a photographing function, a photograph viewing function, a TV viewing function, for example, mobile broadcasting such as DMB and DVB, a music reproducing function such as MP3, and a widget function. The display unit 140 is generally a Liquid Crystal Display (LCD), but may be an Organic Light Emitting Diode (OLED), an active matrix OLED.

The display unit 140 may provide a portrait view mode or a landscape view mode when screen data is displayed. The display unit 140 may include a touch input unit (not shown). The display unit 140 may be a touch screen. The display unit 140 may generate an input signal such as a touch signal corresponding to a user input, when the display unit 140 is a touch screen, and may transmit the generated input signal to the controller 150. The display unit 140 may display screen data processed according to AppStore service such as an AppStore list screen, a list screen having at least one item for access to the AppStore server, and an AppStore server access screen visually.

The controller 150 controls overall operation of the mobile terminal. The controller 150 may control function, related to the AppStore service, such as a function of requesting an AppStore list from the DSS and receiving a corresponding AppStore list when a searching application is executed, a function of updating the received AppStore list, a function of accessing a selected AppStore server, a function of receiving an AppStore browser application from the accessed AppStore server, a function of creating an item corresponding to the received AppStore browser application, a function of writing an item list using the created items, a function of receiving an application list from an AppStore server corresponding to the selected item, a function of accessing the AppStore and downloading a selected application. In addition, the controller 150 performs various control operations related to usual functions of the mobile terminal. For example, the controller 150 may control the communication module 110 when a communication function is executed using the communication module 110. The controller 150 will be described in more detail when an operation controlling method is described later.

The mobile terminal of FIG. 1 may be implemented as any mobile terminal, such as a bar type, a folder type, a slider type, a swing type, a flip type mobile terminal, etc. The mobile terminal according to the exemplary embodiment of the present invention may be implemented as any type of information communication device, multimedia device, and application thereof, for example a small device such as a mobile communication terminal operating according to communication protocols corresponding to various communication systems, a smart phone, a Portable Multimedia Player (PMP), a Personal Digital Assistant (PDA), a digital broadcasting player, a music player such as an MP3, and a portable game machine FIG. 2 is a sequence diagram illustrating a method of providing an AppStore service according to an exemplary embodiment of the present invention.

Figure 2:
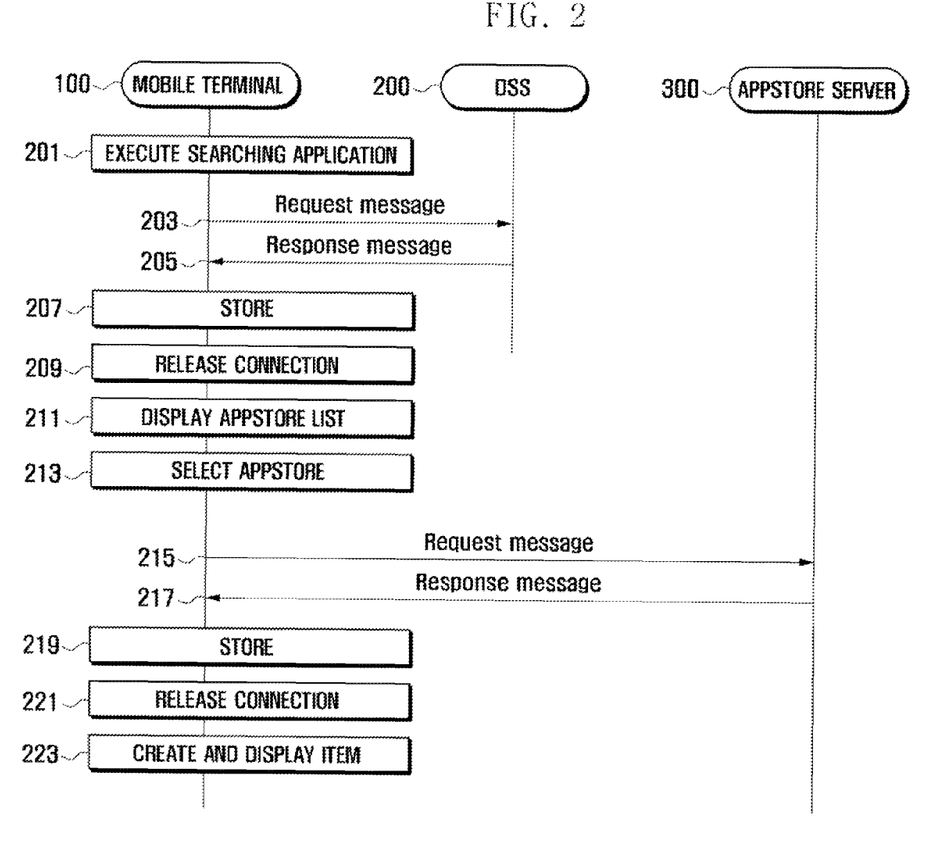
FIG. 2 is a sequence diagram illustrating a sequence of providing an AppStore service in a system according to an exemplary embodiment of the present invention.

Referring to FIG. 2, a system for providing AppStore service according to an exemplary embodiment of the present invention may include an AppStore server 300, a DSS 200, and a mobile terminal 100. A plurality of AppStore servers 300 may be included.

The AppStore server 300 provides various applications corresponding to AppStore service. The AppStore server 300 may provide an AppStore browser application and an application list in response to a request from the mobile terminal 100.

The DSS 200 communicates with at least one AppStore server and manages AppStore server information provided from the at least one AppStore server as an AppStore list. The DSS 200 may provide the AppStore list in response to a request from the mobile terminal 100.

The mobile terminal 100 may acquire the AppStore list from the DSS 200 and a browser application from at least one AppStore selected in the AppStore list. The mobile terminal 100 may create an item corresponding to the browser application acquired from the AppStore server and provide the created item as an item list. The mobile terminal 100 processes access to a corresponding AppStore server by an item selected from the item list. For example, the mobile terminal 100 may access an AppStore server corresponding to a specific item when the specific item is selected from the item list and receive an application lists from the AppStore server to store the same. The mobile terminal 100 may download and install an application selected by a user from the application list.

The mobile terminal 100 receives an execution event of executing a searching application in step 201. For example, the controller 150 of the mobile terminal 100, when a user inputs an execution event for executing the searching application using the input unit 120 or the display unit 140, receives an input signal corresponding to the execution event. The execution event may include a hot key button (not shown) input of the input unit 120, allocated for the execution of the searching application, and a touch input of a touch region allocated for the execution of the searching application. When the execution event is detected, the mobile terminal 100 creates a request message for the AppStore list and transmits the created request message to the DSS in step 203.

When the request message is received from the mobile terminal 100, the DSS 200 transmits a response message as a response to the received request message to the mobile terminal 100 in step 205. The DSS 200 may transmit the response message including the stored AppStore list stored in its own database. The AppStore list stored in the database may be updated periodically based on AppStore information transmitted from at least one AppStore server. For example, the DSS 200 may communicate with a plurality of AppStore servers periodically to receive AppStore information provided by the AppStore servers and may update and manage the AppStore list based on the received AppStore information. Although not shown in FIG. 2, the DSS 200 may perform authentication of the mobile terminal 100 when receiving the request message. The authentication may be performed according to a method defined between the mobile terminal 100 and the DSS 200.

The mobile terminal 100, when the response message is received from the DSS 200, may extract an AppStore list included in the response message and store the extracted AppStore list to the storage 130 in step 207. In this case, the controller 150 of the mobile terminal 100 may store the AppStore list by updating an AppStore list received and stored previously. The mobile terminal 100 may release the connection with the DSS 200 in step 209. This step is made for the convenience of description and may be omitted. For example, the mobile terminal 100 may not access the DSS 200 in step 300 but may transmit the created request message. In this case, since the accessing operation does not required, the connection release in step 209 may be omitted.

The mobile terminal 100 may display the AppStore list stored in the storage 130 through the display unit 140 in step 211. The displaying of the AppStore list may be performed by automatically displaying the received AppStore list when the searching application is executed. Thus, when a user does not set the automatic displaying function for the purpose of updating the AppStore list, the sequence of automatically display the AppStore list may be omitted.

The mobile terminal 100 receives a choice event of selecting a specific AppStore when the AppStore list is displayed in step 213. For example, the controller 150 of the mobile terminal 100, when a user inputs the choice event of selecting an item of a specific AppStore from items of the AppStore list using the input unit 120 or the display unit 140, receives an input signal corresponding to the input.

The mobile terminal 100, when the choice event is detected, creates a request message to request the AppStore browser application from a corresponding AppStore server 300 and transmits the created request message to the AppStore server 300 in step 215. For example, the controller 150 of the mobile terminal 100, when the choice event of selecting an item of the specific AppStore from the AppStore list displayed on the display unit 140 is received, may extract AppStore information (for example, a Uniform Resource Locator (URL) address) on the AppStore corresponding to the item. The controller 150 may activate the communication module 110 and may transmit a request message to a corresponding AppStore server 300 based on the extracted AppStore information.

The AppStore server 300, when receiving the request message from the mobile terminal 100, transmits a response message as a response to the request message to the mobile terminal 100 in step 217. The AppStore server 300 may transmit the response message including an AppStore browser application capable of directly accessing the AppStore server 300. Although not shown in FIG. 2, the AppStore server 300 may perform authentication of the mobile terminal 100 when receiving the request message. The authentication may be performed in an authenticating method defined between the mobile terminal 100 and the AppStore 300.

The mobile terminal 100, when the response message is received from the AppStore server 300, may extract the AppStore browser application included in the response message and store the same in the storage 130 in step 219. The mobile terminal 100 may release the connection with the AppStore server 300 in step 221. Step 211 is made for the convenience of description and may be omitted. For example, the mobile terminal 100 may not access the AppStore server 300 in step 215 but may instead transmit the created request message. In this case, since the accessing operation is not required, the connection release in step 221 is omitted. The mobile terminal 100 may access a corresponding AppStore server to download an application when the created item is selected after that.

The mobile terminal 100 may create an item corresponding to the AppStore browser application stored in the storage 130 in the form corresponding to a setting method and control the displaying of the same in step 223. For example, the controller 150 of the mobile terminal 100 may create items capable of executing the AppStore browser applications stored in the storage 130 and make the created items into a list. The items may be provided in the form of an icon or text of executing a mapped corresponding AppStore browser application. By doing so, a user may skip an input for the access to a specific AppStore server such as a menu selection and an input of URL and may access directly the desired AppStore server by selecting the corresponding item. In this description, the item may be provided as an icon or text as described above. Thus, the AppStore browser list (item list) in which the items are provided may be a block style list of icons or a simple text list.

The mobile terminal 100 may control processes such as access to a corresponding AppStore server when a user selects a specific item from the AppStore browser list, downloading a specific application from a corresponding AppStore, and installation of the downloaded specific application. For example, as described above, the mobile terminal 100, when a specific item is selected from the AppStore browser list, may access an AppStore server 300 corresponding to the selected item. The mobile terminal 100 may receive and store an application list of applications included in the AppStore server 300. The mobile terminal 100 may download the application corresponding to the user's choice in the application list from the AppStore server 300 and may install the downloaded application.

Figure 3:
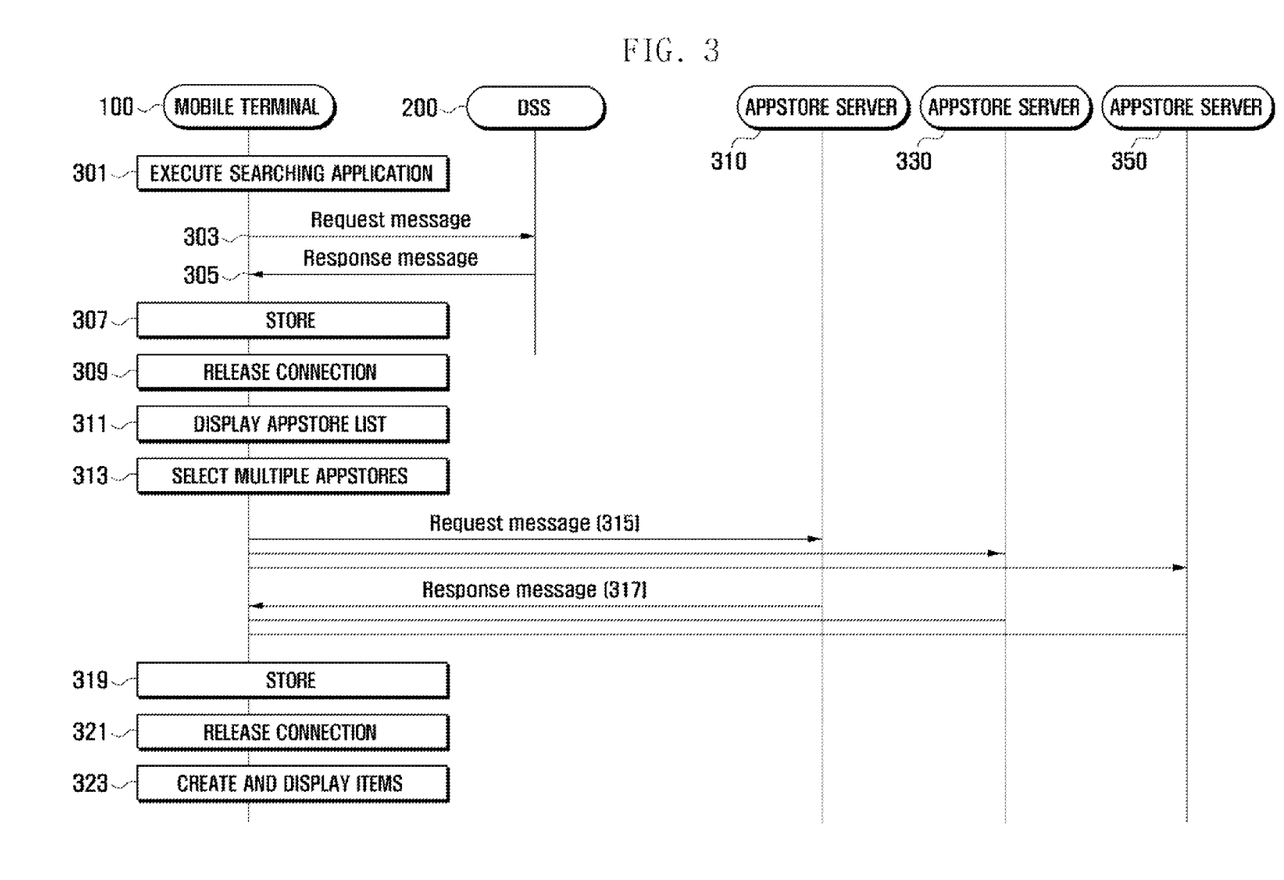
FIG. 3 is a sequence diagram illustrating a sequence of providing an AppStore service in a system according to an exemplary embodiment of the present invention.

FIG. 3 is a view illustrating a method of providing an AppStore service according to an exemplary embodiment of the present invention.

Referring to FIG. 3, the mobile terminal 100 receives the execution event of executing the searching application in step 301. For example, the controller 150 of the mobile terminal 100, when a user inputs the execution event of executing the searching application using the input unit 120 or the display unit 140, receives the input signal. The execution event may include a hot key button (not shown) input of the input unit 120, allocated for the execution of the searching application, and a touch input of a touch region allocated for the execution of the searching application. When the execution event is detected, the mobile terminal 100 creates a request message for making a request for the AppStore list and transmits the created request message to the DSS in step 303.

When the request message is received from the mobile terminal 100, the DSS 200 transmits a response message as a response to the received request message to the mobile terminal 100 in step 305. The DSS 200 may transmit the response message including the stored AppStore list stored in its own database. The AppStore list stored in the database may be updated periodically based on AppStore information transmitted from at least one AppStore server. For example, the DSS 200 may communicate with a plurality of AppStore servers periodically to receive AppStore information provided by the AppStore servers and may update and manage the AppStore list based on the received AppStore information. Although not shown in FIG. 3, the DSS 200 may perform authentication about the mobile terminal 100 when receiving the request message.

The mobile terminal 100, when the response message is received from the DSS 200, may extract an AppStore list included in the response message and store the extracted AppStore to the storage 130 in step 307. In this case, the controller 150 of the mobile terminal 100 may store the AppStore list by updating an AppStore list received and stored previously. The mobile terminal 100 may release the connection with the DSS 200 in step 309. This step is made for the convenience of description and may be omitted.

The mobile terminal 100 may display the AppStore list stored in the storage 130 through the display unit 140 in step 311. The displaying of the AppStore list may be performed in a method of automatically displaying the received AppStore list when the searching application is executed. When a user does not set the automatic displaying function for the purpose of updating the AppStore list, the automatic display of the AppStore list may be omitted.

The mobile terminal 100 receives a choice event of selecting multiple specific AppStores when the AppStore list is displayed in step 313. For example, the controller 150 of the mobile terminal 100, when a user inputs the choice event of selecting three items of a specific AppStore from items of the AppStore list using the input unit 120 or the display unit 140, receives an input signal corresponding to the input.

The mobile terminal 100, when the choice event is detected, creates request messages requesting AppStore browser applications to from corresponding AppStore servers 310, 330, and 350 and transmits the created request messages to the AppStore servers 310, 330, and 350, respectively in step 315. For example, the controller 150 of the mobile terminal 100, when the choice event of selecting multiple items of a plurality of specific AppStores from the AppStore list displayed on the display unit 140, may extract AppStore information (for example, URL address) on the AppStores corresponding to the items. The controller 150 may activate the communication module 110 and may transmit the request messages to the corresponding AppStore servers 310, 330, and 350 based on the extracted AppStore information.

The AppStore servers 310, 330, and 350, when receiving the request messages from the mobile terminal 100, transmit response messages as responses to the request messages to the mobile terminal 100, respectively in step 317. The AppStore servers 310, 330, and 350 may transmit the response messages including AppStore browser applications capable of accessing directly to the AppStore servers 310, 330, and 350. Although not shown in FIG. 3, the AppStore servers 310, 330, and 350 may perform authentication of the mobile terminal 100 when receiving the request messages. The authentication may be performed in an authenticating method defined between the mobile terminal 100 and the AppStores 310, 330, and 350.

The mobile terminal 100, when the response messages are received from the AppStore servers 310, 330, and 350, may extract the AppStore browser applications included in the response messages and store the same in the storage 130 in step 319. The mobile terminal 100 may release the connections with the AppStore servers 310, 330, and 350 in step 321. The step 311 is made for the convenience of description and may be omitted.

The mobile terminal 100 may create items corresponding to the AppStore browser applications stored in the storage 130 in the form corresponding to a setting method and control the displaying of the same in step 323. For example, the controller 150 of the mobile terminal 100 may create items capable of executing the AppStore browser applications stored in the storage 130 and make created items into a list. The items may be provided in the form of an icon or text of executing mapped corresponding AppStore browser applications. By doing so, a user may skip an input for the access to a specific AppStore server and may access directly the desired AppStore server by selecting the corresponding item. In this description, the item may be provided as an icon or text as described above. Thus, the AppStore browser list (item list) in which the items are provided may be a block style list of icons or a simple text list.

The mobile terminal 100 may control processes such as access to a corresponding AppStore server when a user selects a specific item from the AppStore browser list, downloading a specific application from a corresponding AppStore, and installation of the downloaded specific application.

Figure 4:
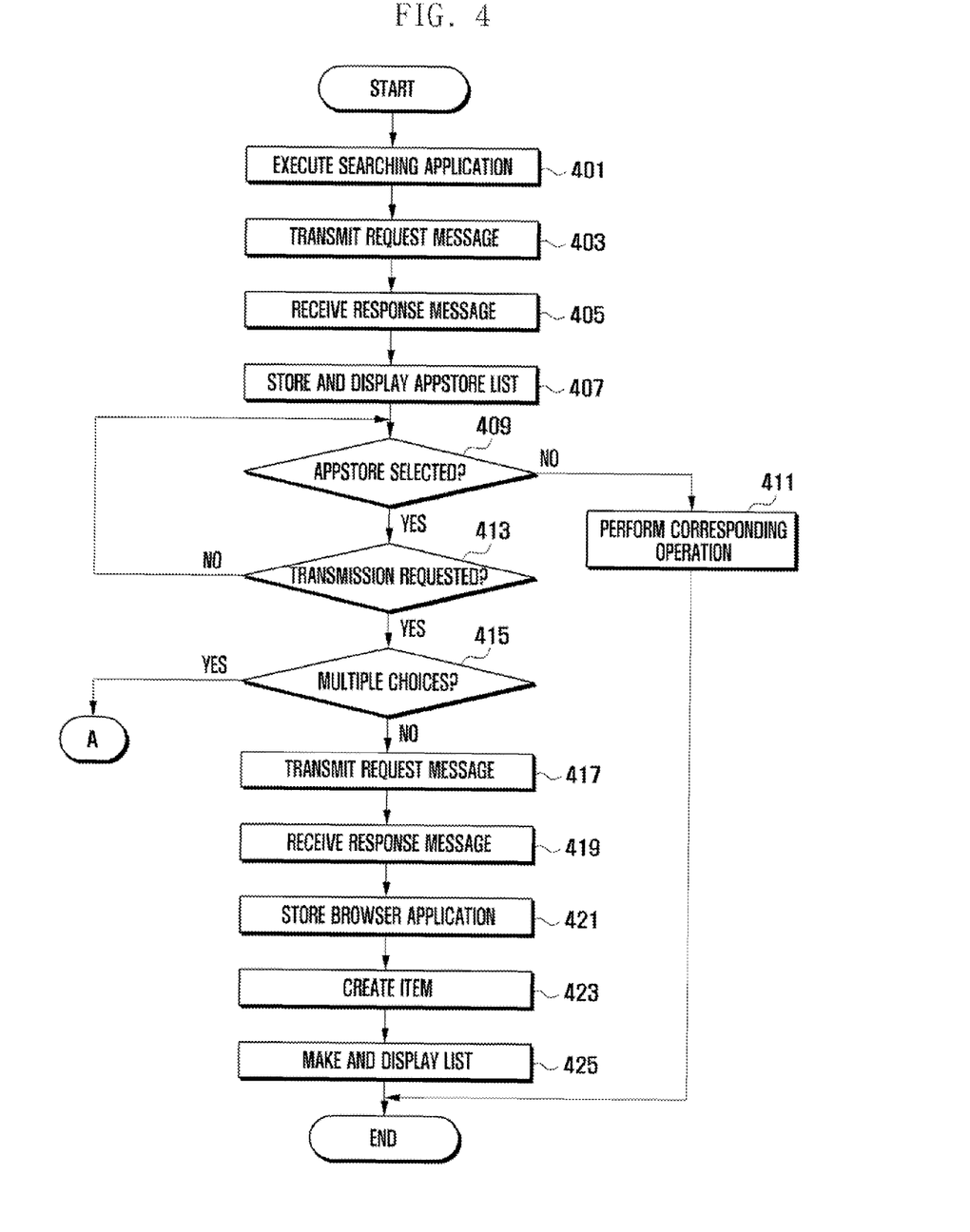
FIGS. 4 and 5 are flowcharts illustrating a control method of supporting an AppStore service according to an exemplary embodiment of the present invention.
Figure 5:
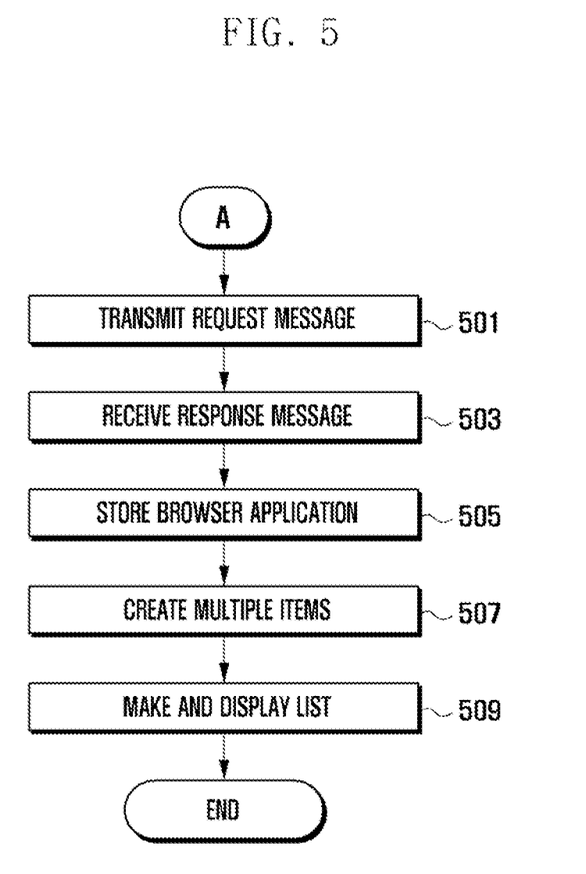

FIGS. 4 and 5 are flowcharts illustrating a control method of supporting an AppStore service according to an exemplary embodiment of the present invention.

Referring to FIGS. 4 and 5, the controller 150 of the mobile terminal 100 executes a searching application for searching the directory search service of an AppStore in step 401. For example, the controller 150, when a user inputs an execution event for executing the searching application using the input unit 120 or the display unit 140, receives an input signal corresponding to the execution event and executes the searching application.

The mobile terminal 100 of the mobile terminal 100 creates a request message for making a request for the AppStore list by executing the searching application and transmits the created request message to the DSS in step 403. The mobile terminal 100 may receive a response message transmitted by the DSS 200 in response to the request message in step 405.

The controller 150 of the mobile terminal 100, when the response message is received from the DSS 200, extracts an AppStore list from the response message, stores the extracted AppStore list to the storage 130, and displays the same on the display unit 140 in step 407. In this description, the controller 150 may store the AppStore list by updating an AppStore list received and stored previously.

The controller 150 of the mobile terminal 100 determines whether a specific AppStore item is selected from the AppStore list in step 409. For example, the controller 150 may determine whether an input signal of selecting a specific AppStore item is received during the displaying of the AppStore list.

The controller 150 of the mobile terminal 100, when the specific AppStore item is not selected from the AppStore list (NO in step 409), may control the performance of a corresponding operation in step 411. For example, the controller 150, when the input signal of selecting the specific AppStore item is not received, may perform the step 407 as described above, display the AppStore list, control operations to be executed after that, or may finish the above-mentioned processes for providing AppStore service according to a request from a user.

When the specific AppStore item is selected from the AppStore list (YES in step 409), the controller 150 of the mobile terminal 100 determines whether there is a request for transmission of the request for an AppStore browser application in step 413. For example, the controller 150 may receive a complete event of selecting a specific AppStore item from the AppStore list and completing the choice of the AppStore. In this description, the complete event may include a button (not shown) input of the input unit 120 that is provided to a main body of the mobile terminal 100 as an event of completing the choice of the AppStore item from the AppStore list, or an input of a touch region of the display unit 140 to which a command of completing the AppStore item selection is allocated. The controller 150, when a user inputs the complete event, receives the input signal and recognizes the input signal as a command of transmitting the request message when the input signal is received.

The controller 150 of the mobile terminal 100, when the transmission of the request message is not requested (NO in step 413), performs step 409 as described above, determines whether the AppStore item is selected, and may control operations to be executed after that. The controller 150 of the mobile terminal 100, when the transmission of the request message is requested (YES in step 413), determines whether multiple AppStore items are selected from the AppStore list in step 415.

When multiple AppStore items have not been selected in step 415 (NO in step 415), the controller 150 of the mobile terminal 100 transmits the request message to the AppStore server according to a selected AppStore item in step 417. For example, when a single AppStore item is selected from the AppStore list and the request message is requested to transmit, the controller 150 may transmit the request message of making a request for the AppStore browser application to a corresponding AppStore server according to AppStore information of the selected AppStore item. The controller 150 may receive a response message transmitted by the corresponding AppStore server in response to the request message in step 419.

When the response message is received from the AppStore server, the controller 150 of the mobile terminal 100 extracts the AppStore browser application from the response message and stores the extracted AppStore browser application to the storage 130 in step 421. The controller 150 may create an item on the stored AppStore browser application in step 423. The item may be created by a method corresponding to a preset method and may be mapped to a corresponding AppStore browser application. For example, the item may be created in form of a specific icon or text.

The controller 150 may make the created items into a list and display the same in step 425. For example, the controller 150 may make the AppStore browser list in which items of executing the AppStore browser applications into a block style list of icons or a simple text list, and may control of displaying of the AppStore browser list.

When multiple AppStore items are selected (YES in step 415), the controller 150 of the mobile terminal 100 transmits the request messages to the AppStore servers corresponding to the selected AppStore items, respectively in step (501). For example, when multiple AppStore items are selected from the AppStore list and the request message is requested for transmission, the controller 150 may transmit the request messages to the corresponding AppStore servers according to respective AppStore information of the selected multiple AppStore items. The controller 150 may receive response messages transmitted by the corresponding AppStore servers in response to the request messages in step 503.

The controller 150, when the response messages from the AppStore servers, extracts the AppStore browser applications from the respective response messages and stores the extracted AppStore browser applications to the storage 130 in step 505. Although not shown in FIGS. 4 and 5, according to an exemplary embodiment of the present invention, the controller 150 of the mobile terminal 100 may determine whether all the response messages are received from all AppStore servers that transmitted the request message. For example, the controller 150 may store information on the AppStore server transmitting the request message. The controller 150, when the response message is received, may compare the information on the AppStore server that transmitted the received response message with the stored information of the AppStore server and may identify an AppStore server that did not transmit the response message. In this case, the controller 150, when an AppStore server did not transmit the response message, may transmit the request message to the corresponding AppStore server. The controller 150, when the response messages are received from all AppStore servers to which the request messages are transmitted, may control operations of extracting the AppStore browser applications from the respective response messages and of storing the extracted AppStore browser applications into the storage 130.

The controller 150 may create a plurality of items on the stored AppStore browser applications in step 507. The items may be created by a method corresponding to a preset method and may be mapped to the corresponding AppStore browser applications. The controller 150 may make the created items into a list to display in step 509. For example, the controller 150 may make the AppStore browser list in which the items of executing the AppStore browser applications are provided into a block style list of icons or a simple text list.

The method of and a system for providing AppStore service according to the exemplary embodiments of the present invention may be recorded in computer-readable media including program commands to implement various operations embodied by a computer. The media may also include, alone or in combination with the program commands, data files, data structures, and the like.

Examples of computer-readable media include magnetic media such as hard disks, floppy disks, and magnetic tape, optical media such as Compact Discs (CDs) and Digital Versatile Discs (DVDs), magneto-optical media such as floptical disks, and hardware devices that are specially configured to store and perform program commands, such as Read-Only Memory (ROM), Random Access Memory (RAM), flash memory, and the like. Examples of program commands include both machine code, such as produced by a compiler, and files containing higher level code that may be executed by the computer using an interpreter. The described hardware devices may be configured to act as one or more software modules being executed by the computer in order to perform the operations of the above-described exemplary embodiments of the present invention, or vice versa.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing an Application Store (AppStore) service in a mobile terminal, the method comprising:
    transmitting a first request message to a directory service server, the first request message including a request for an AppStore list, wherein the AppStore list comprises information of a plurality of AppStore servers, each of the AppStore servers providing a corresponding App- Store service which provides a plurality of applications available for download to the mobile terminal;

receiving a first response message including the AppStore list from the directory service server;

receiving an input signal selecting at least one AppStore server from the received AppStore list;

transmitting a second request message to the selected at least one AppStore server, the second request message including a request for an AppStore browser application including an AppStore service of a corresponding AppStore server;

receiving a second response message including the AppStore browser application from the selected at least one AppStore server; and creating items corresponding to the AppStore browser application and displaying the items in the form of a list.

2. The method of claim 1, wherein the transmission of the second request message comprises:

determining whether, there is a request for transmission of the second request message; and determining whether, when transmission of the second request message is requested, multiple AppStore servers are selected from the AppStore list.

3. The method of claim 2, wherein the determining of whether the multiple AppStore servers are selected comprises:

transmitting, when the multiple AppStore servers are not selected, the second request message to one selected AppStore server; and transmitting the second request message to the multiple AppStore servers when the multiple AppStore servers are selected.

4. The method of claim 1, wherein the reception of the first response message comprises:

extracting, when a response message is received from the directory service server, an AppStore list from the response message; and storing the extracted AppStore list in a storage and displaying the same on a display unit.

5. The method of claim 1, wherein the AppStore browser application comprises a function of accessing a corresponding AppStore server directly.

6. The method of claim 1, further comprising:

extracting the AppStore browser application when the second response message is received;

storing the extracted AppStore browser application in a storage;

creating an item on the stored AppStore browser application according to a preset method; and displaying the created item in an icon type item list or a text type item list.

7. The method of claim 6, further comprising:

directly accessing, when a specific item is selected from the item list, an AppStore server corresponding to the selected specific item; and receiving an application list of applications held by the AppStore server and storing the application list.

8. A method of providing an Application Store (AppStore) service, the method comprising:

requesting, by a mobile terminal, an AppStore list from a directory service server by a mobile terminal, wherein the AppStore list comprises information of a plurality of AppStore servers, each of the AppStore servers providing a corresponding AppStore service which provide a plurality of applications available for download to the mobile terminal;

transmitting, by the directory service server, an AppStore list in response to the request from the mobile terminal;

receiving, by the mobile terminal, an input signal selecting at least one AppStore server from the received AppStore list;

requesting, by the mobile terminal, an AppStore browser application including an AppStore service of a corresponding AppStore server from the selected at least one AppStore server;

transmitting, by the selected at least one AppStore server, the AppStore browser application in response to the request from the mobile terminal; and creating, by the mobile terminal, when at least one AppStore browser application is received, an item corresponding to the corresponding AppStore browser application.

9. The method of claim 8, further comprising:

displaying an item list of the created item;

accessing, when a specific item is selected from the item list, an AppStore server corresponding to the specific item; and receiving and storing an application list of applications held by the AppStore server.

10. An Application Store (AppStore) service providing system comprising:

a plurality of AppStore servers for providing an application corresponding to an AppStore service which provides a plurality of applications available for download to the mobile terminal;

a directory service server for communicating with the plurality of AppStore servers and managing AppStore server information provided from the plurality of AppStore servers as an AppStore list; and a mobile terminal for acquiring the AppStore from the directory service server, for acquiring an AppStore browser application including an AppStore service of a corresponding AppStore server from at least one AppStore server selected from the AppStore list, for creating an item corresponding to the acquired AppStore browser application, and for processing access to a corresponding AppStore server based on the item.

11. The system of claim 10, wherein the mobile terminal determines, when an AppStore browser application is requested to an AppStore server selected from the AppStore list, whether multiple AppStore servers are selected, requests, when a single AppStore server is selected, an AppStore browser application from the single AppStore server, and requests, when the multiple AppStore servers are selected, the AppStore browser application from the multiple AppStore servers respectively.

12. The system of claim 10, wherein the mobile terminal, when accessing a corresponding AppStore server based on the item, receives and stores an application list of applications held by the corresponding AppStore server.

13. The system of claim 10, wherein the directory service server, when receiving a request for an AppStore list from the mobile terminal, performs authentication of the mobile terminal according to a preset method.

14. The system of claim 10, wherein the at least one AppStore server, when receiving a request for a browser application from the mobile terminal, performs authentication of the mobile terminal according to a preset method.

* * * * *